United States Patent Office 3,142,792
Patented July 28, 1964

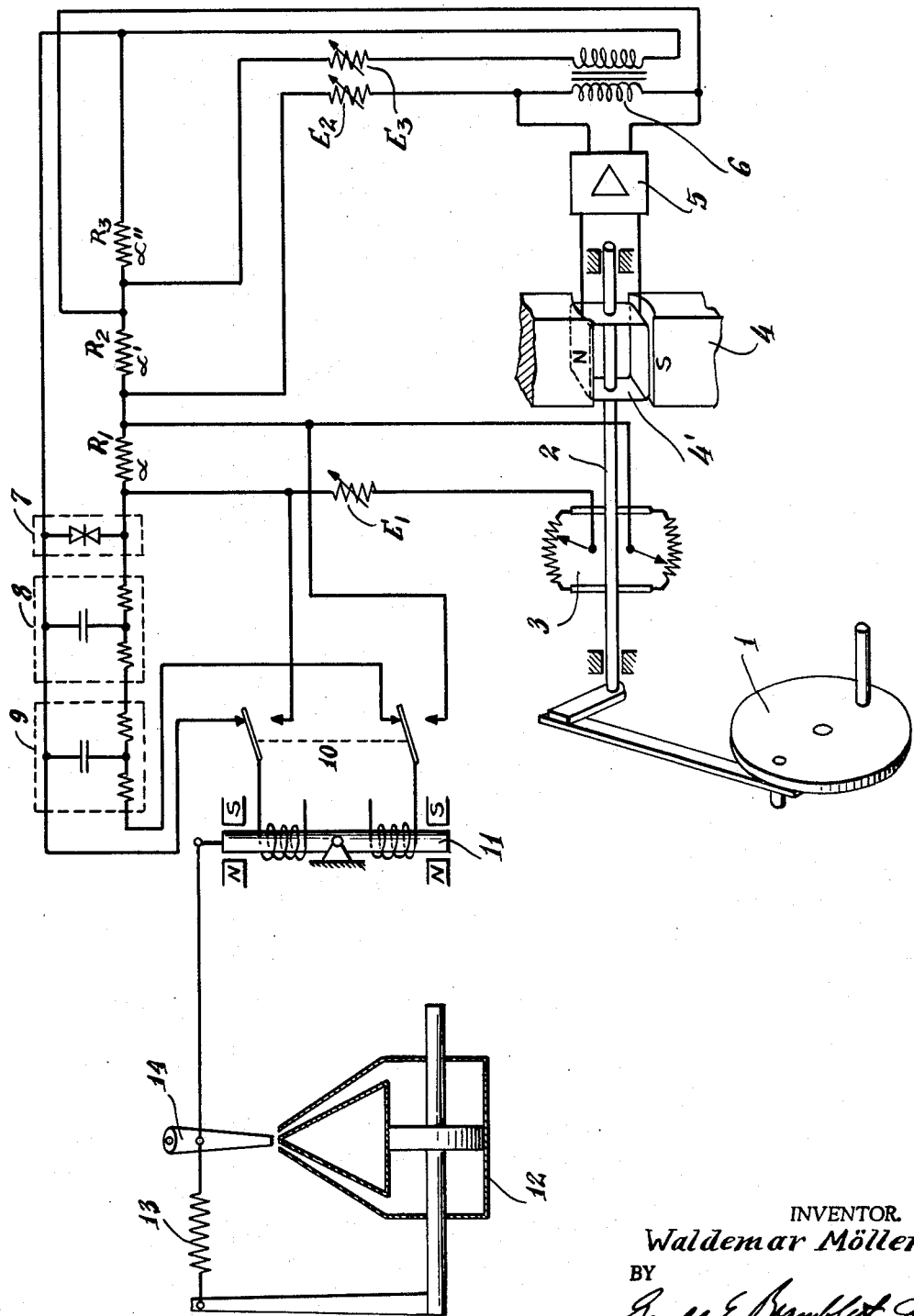

3,142,792
AUTOMATIC FLIGHT CONTROL DEVICE
Waldemar Möller, Uberlingen (Bodensee), Germany, assignor to Bodenseewerk Perkin-Elmer & Co. G.m.b.H., Uberlingen (Bodensee), Germany
Filed Feb. 1, 1962, Ser. No. 170,454
5 Claims. (Cl. 318—489)

This application is a continuation-in-part of my copending application Serial No. 841,302, filed September 21, 1959, now abandoned.

This invention relates to a control device and, in particular, to a stabilization or control device for flying craft having autopilots responsive to servo feedback. As is well known, oscillation-free control can only be achieved if the rotation of the servomotor is always proportional to the deviation of the craft from the desired position in space. With conventional restoring means, however, this is not fully achieved and particularly not under all operational conditions. With higher frequencies of oscillation, the mass moment of inertia of the servomotor, its limited speed and amplifier influences have a disturbing effect, so that spatial deviation is not represented proportionally by the servomotor movement. Amplitude as well as phase errors are generated which make the control action unstable. If the frequency of deviation about the desired spatial position surpasses the speed of the servomotor, a shift in phase of 90° will occur. This is a result of the mass moment of inertia of the adjusting mechanism, i.e., the servomotor and the control member operated by the motor. The phase lag may even increase up to 180°.

It is the object of the invention to compensate for these individually different disturbing influences of the control mechanism. A further object is to achieve an adjustment of the control mechanism that is properly phased with respect to the variation of the controlled object from the desired position. In such event, the amplitude of the deflection of the control mechanism becomes smaller with increasing frequency.

In accordance with the invention, an automatic pilot controlling a servomotor is supplied with an input signal which is a function of the deviation of the controlled object and the first and second derivatives of the deviation with respect to time. The input signal so obtained is reduced by means of a peak limiter to the value required to move the aircraft control member to its end position. If a signal of constant amplitude but of variable frequency is available as the input signal to the autopilot, it is possible, by varying its individual components, to achieve any desired ratio of phase and amplitude between the input and feedback signals. It is thus possible to compensate for the disturbing influences of the adjusting mechanism and to avoid rapid phase changes and discontinuities between the deviation from the desired spatial position and the setting of the adjusting mechanism. With such an input signal differentiated from deviation about a desired position, however, the amplitude would increase with increasing frequency. The function of the peak limiter is to "clip" the amplitude to decrease it to a limiting value without thereby influencing the phase position of the input signal. The deflection of the adjusting mechanism as a function of the frequency of the input signal is thereby decreased in amplitude without any phase lag of the adjusting mechanism. Such an operation of the control device achieved by the present invention is useful for many control operations. It is especially useful for the stabilization or control of flying craft since, normally, an increase in frequency of the input signal is related to an increase in flying speed which requires a smaller deflection of the adjusting mechanism.

Rather than generating a separate feedback signal proportional to servomotor position, speed, and acceleration, the function of such a signal is provided by atenuating the input signal by means of time-delay circuits and by means of a simple mechanical feedback on the controlling motor. By selecting suitable parameters for the RC (time-delay) circuits, the effect on the automatic pilot is identical to the introduction of feedback signals proportional to control motor speed and acceleration. The simple mechanical "force" feedback which is a function of control motor deflection then becomes the only such element required.

As a modification of this invention, the control motor may be disconnected from the input summation signal and connected directly to the output of a manual flight control member. It thus becomes possible to use the automatic pilot-control motor combination as a power amplifier for manual flight control. This is particularly important in the case of large airplanes requiring auxiliary force for actuating the control surfaces. By means of this feature, the need for special equipment to provide the auxiliary force during manual flight control is avoided.

An essential advantage of the invention resides in the fact that, for control purposes, an adjusting mechanism of small size will be sufficient and the connecting elements between the servomotor and the control member are subjected to little mechanical strain. The limitation of the maximum acceleration of the movement of the adjusting mechanism achieved by the invention also prevents fluttering.

An embodiment of the invention is schematically represented in the single figure of the accompanying drawing and more fully described in the following detailed description.

Numeral 1 designates a position transmitter which is symbolically shown by a crank drive acting upon axis 2. The position transmitter may take the form of a gyroscope for exerting a precession momentum on axis 2 or it may be a manual flight control member. The position of said axis 2 is scanned by means of a potentiometer tap 3, so that a voltage $a$ that is proportional to the rotation of axis 2 appears across resistor $R_1$. At the same time a voltage is induced in coil 4' of a dynamic-inductive tap system 4 arranged on axis 2 which is proportional to the speed of rotation of axis 2. This induced voltage is amplified in a preamplifier 5. The amplified output voltage $a'$ appears across resistance $R_2$ which is in series with resistance $R_1$. At the same time, the output voltage $a'$ is impressed upon a transformer 6 operating as a differentiation member. The secondary voltage $a''$ of transformer 6 is applied across resistance $R_3$ which is connected in series with $R_1$ and $R_2$. The voltages $a$, $a'$, $a''$, which correspond to the position ($a$), the speed of rotation ($a'$) and the rotary acceleration ($a''$), of axis 2, can be varied by means of adjustable resistances $E_1$, $E_2$, and $E_3$. The summation voltage $U=a+a'+a''$ generated in the circuit of resistances $R_1$, $R_2$, and $R_3$ is applied across a peak limiter 7 set to provide a peak signal having a value sufficient to move the aircraft control surface to its end position. This signal is then applied to two adjustable, series-connected time-delay RC circuits 8, 9 and is then applied to the coils of electromagnetic controller 11. The deflection of a hydraulic pilot nozzle 14 is moved to the right or left by controller 11. Nozzle 14 actuates a hydraulic servomotor 12 which actuates the rudder or other control surface (not shown). A "feedback" spring 13 provides a restoring force on nozzle 14 which is dependent on the degree of adjustment. In this manner, proportionality between control surface adjustment and the input voltage to controller 11 is achieved. The amplitude and phase relationships between this input voltage and summation voltage U can be adjusted as desired by time-delay circuits 8, 9.

The electro-hydraulic servomotor 11, 12, 13, 14 is assembled as a special unit which may be utilized as the power amplifier of a manual control element. When used for this purpose, switch 10 is actuated to disconnect controller 11 from the input voltage U and, instead, connects the controller to receive a single voltage proportional to the manual control deflection. Potentiometer 3 is then actuated by such manual control element rather than by a gyroscope.

Various other modifications and variations will be apparent to those skilled in the art. The invention is to be limited only by the scope of the following claims.

I claim:
1. Apparatus for controlling the spatial position of a flying craft comprising:
   control means for guiding said craft to assume a preselected spatial position;
   means for sensing any deviation of said craft from its preselected spatial position and for producing a first signal proportional to the sum of the amount of said deviation and the first and second derivatives of said deviation with respect to time;
   means for limiting the amplitude of said first signal to the value required for maximum movement of said control means;
   time-delay circuit means for attenuating said limited first signal in an amount proportional to the velocity and acceleration of said control means;
   automatic pilot means responsive to the output of said time-delay circuit means for controlling the movement of said control means;
   and retarding means for applying an opposing force to said control means proportional to the displacement thereof.

2. The apparatus of claim 1 wherein said control means is a pneumatic piston-cylinder.

3. The apparatus of claim 2 wherein said retarding means is a spring.

4. The apparatus of claim 3 wherein said time-delay circuit means comprises a resistance-capacitance network.

5. The apparatus of claim 1 wherein said automatic pilot means include a transfer switch adapted to disconnect said pilot means from the output of said time-delay circuit means, and to connect said pilot means to receive solely that portion of said first signal proportional to the amount of deviation of said craft.

References Cited in the file of this patent
UNITED STATES PATENTS

| | | |
|---|---|---|
| 2,446,567 | White et al. | Aug. 10, 1948 |
| 2,462,095 | Halpert | Feb. 22, 1949 |